(12) United States Patent
Ulery, Jr. et al.

(10) Patent No.: US 6,386,586 B1
(45) Date of Patent: May 14, 2002

(54) MOBILE EQUIPMENT STABILIZER FOOT PAD

(75) Inventors: Don E. Ulery, Jr., Tracy, CA (US); Robert Wells, Reno, NV (US); Timothy P. Goss, Tracy, CA (US)

(73) Assignee: Tuff Industries, Inc., Livermore, CA (US)

( * ) Notice: Subject to any disclaimer, the term of this patent is extended or adjusted under 35 U.S.C. 154(b) by 0 days.

(21) Appl. No.: 09/606,415

(22) Filed: Jun. 28, 2000

(51) Int. Cl.$^7$ ................................................ B60R 9/18
(52) U.S. Cl. ...................................... 280/762; 212/301
(58) Field of Search .............................. 280/762, 763.1, 280/764.1, 765.1, 766.1; 182/109, 110, 111; 212/302, 303, 304, 301

(56) References Cited

U.S. PATENT DOCUMENTS

| | | | | |
|---|---|---|---|---|
| 1,909,620 A | * | 5/1933 | Lang | 182/109 |
| 1,973,226 A | * | 9/1934 | Rose | 182/109 |
| 3,219,362 A | * | 11/1965 | Epstein | 280/763.1 |
| 3,721,458 A | * | 3/1973 | Mitchell | 280/764.1 |
| 3,831,774 A | * | 8/1974 | Moore | 280/763.1 |
| 3,930,668 A | * | 1/1976 | Schuermann et al. | 280/763.1 |
| 4,039,206 A | * | 8/1977 | Nault | 280/763.1 |
| 4,761,021 A | | 8/1988 | Lagsdin | |
| 4,889,362 A | | 12/1989 | Lagsdin | |
| 5,050,904 A | | 9/1991 | Lagsdin | |
| 5,051,057 A | * | 9/1991 | Kremer | 414/685 |
| 5,054,812 A | | 10/1991 | Lagsdin | |
| 5,466,004 A | | 11/1995 | Lagsdin | |
| 5,547,220 A | | 8/1996 | Lagsdin | |
| 5,667,245 A | | 9/1997 | Lagsdin | |
| 5,735,377 A | * | 4/1998 | Herren | 193/33 |
| 6,227,570 B1 | * | 5/2001 | Martinez et al. | 280/764.1 |

* cited by examiner

Primary Examiner—Brian L. Johnson
Assistant Examiner—Bryan Fischmann
(74) Attorney, Agent, or Firm—LaRiviere, Grubman & Payne, LLP

(57) ABSTRACT

A shaped interior stiffener is molded into a polymeric material pad, forming a cushioning pad that can be affixed to a stabilizer leg foot on mobile equipment such as a crane or excavator. A variety of foot pads is contemplated, each specifically designed to fit without alteration to a variety of different manufacturer's equipment through use of bolts protruding from one surface of the foot pad. The interior stiffener is shaped in such a manner that it conforms to the bolt pattern of a particular equipment model, having socket-like receivers for the heads of the protruding bolts, efficiently distributes stress throughout the structure to minimize stress failures, and provides a plurality of ribs, webs and openings to allow maximum durability and adhesion between the stiffener and the polymeric foot pad material which encapsulates the stiffener.

14 Claims, 6 Drawing Sheets

(Rev 1)

MOBILE EQUIPMENT STABILIZER FOOT PAD

TECHNICAL FIELD OF THE INVENTION

The present invention relates to the design and manufacture of foot pads deployed on stabilizing legs used to prevent mobile hoisting and excavation equipment from tipping during use.

BACKGROUND ART

In the present practice, stabilizing legs of mobile heavy equipment such as back hoes, cranes and the like are either provided with hard metal foot pads or coated metal foot pads. The purpose of the pads is to minimize marring of surfaces such as concrete or asphaltic pads where the equipment is placed when in use. Frequently the original equipment foot pads are augmented in the field by bolting onto the foot pieces of truck tire treads, so that a more cushioned, durable, non-slip pad is obtained.

BRIEF DISCLOSURE OF THE INVENTION

The present invention utilizes a uniquely-shaped interior stiffener molded into a polymeric material pad, forming a cushioning pad that can be affixed to a stabilizer leg foot pad. A variety of foot pads is contemplated, each specifically designed to fit without alteration to a variety of manufacturer's equipment. The interior stiffener is shaped in such a manner that it conforms to the foot and bolt pattern of a particular equipment model, efficiently distributes stress throughout the structure to minimize pad stress failures, and provides a plurality of openings or holes therethrough to allow for strength with lighter weight while providing maximum durability and adhesion between the stiffener and the polymeric surface material.

BRIEF DESCRIPTION OF DRAWINGS

For fuller understanding of the present invention, reference is made to the accompanying drawing in the following detailed description of the Best Mode For Carrying Out the Invention. In the drawing.

Figure 1:
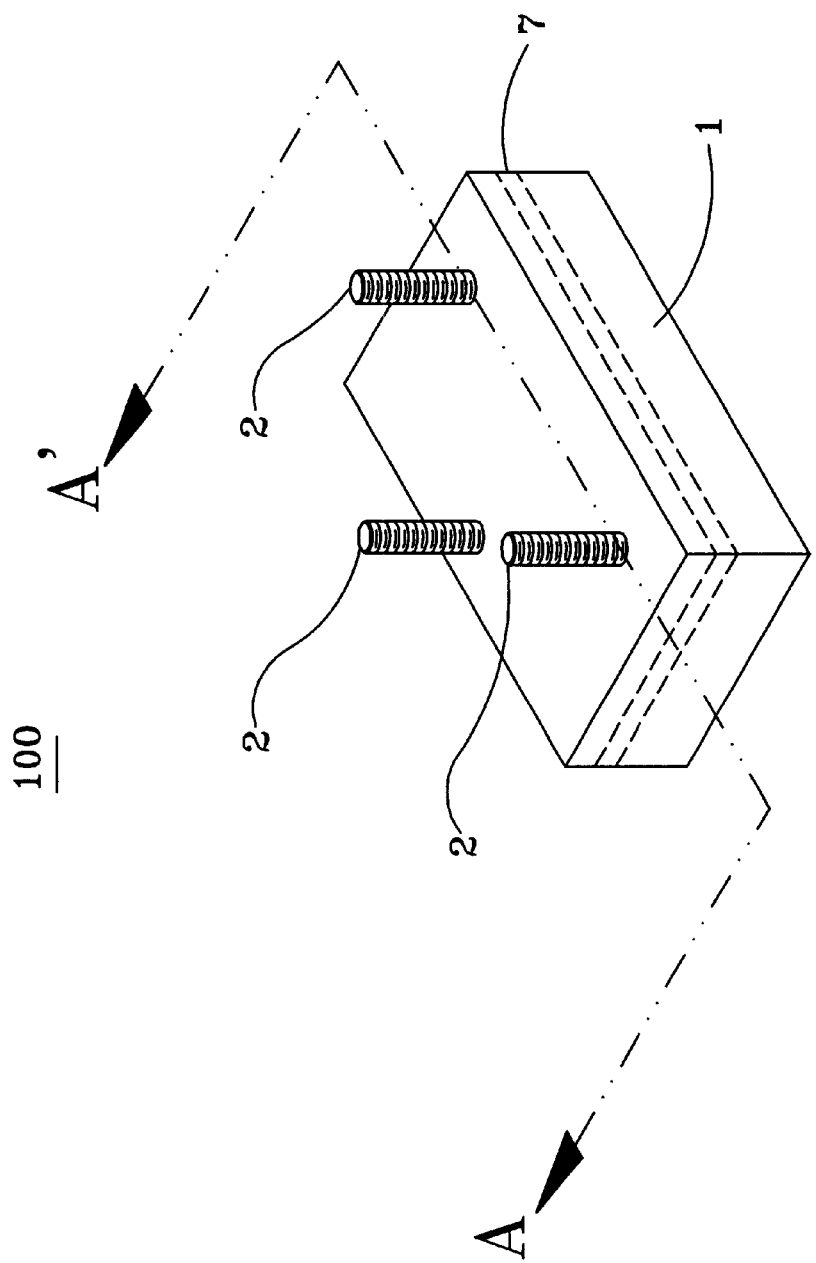
FIG. 1 is a perspective view of a simple foot pad in accordance with the present invention.

Reference numbers refer to the same or equivalent parts of the present invention throughout the several figures of the drawing.

BEST MODE FOR CARRYING OUT THE INVENTION

A simplified foot pad 100 manufactured according to the principles of the present invention is shown in the figures and described below. It is to be understood that a variety of designs, each intended to fit a particular make and model of machine, may be manufactured using the principles of the present invention without straying from the intent and teachings of the present invention. While the description below is purposely simplified to best illustrate the nature of the invention, actual foot pads will vary in complexity of detail from the following disclosure depending upon common materials engineering practices and the demands on the foot pad created by the design and use of the equipment upon which the foot pad is used.

Figure 6:
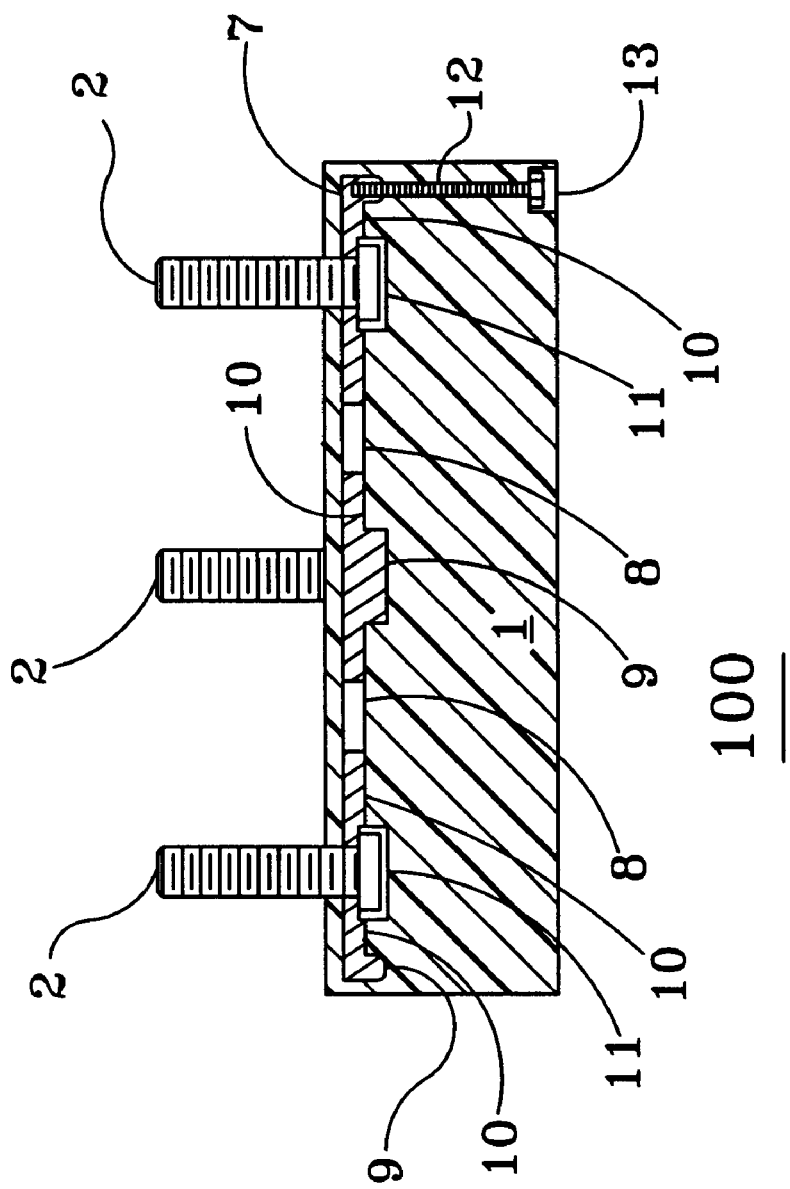
FIG. 6 is a cross-section view of an alternative embodiment of the foot pad of FIG. 1.

Referring to FIG. 1, a perspective view of a simplified foot pad 100 is shown. Foot pad 100 consists of an embedded stiffener 7 with attached bolts 2 protruding from the surface of the material comprising pad 1. Pad 1 is preferable a resilient high strength vinyl hybrid such as manufactured by Chemionics Company, Tallmadge, Ohio. Other materials suitable for use as pad 1 may also be identified by persons knowledgeable in materials science for polymeric materials. Pad 1 is molded around stiffener 7 and completely encapsulates the stiffener as indicated by the dotted line. Molding is the preferred manufacturing method but extrusion and adhesion technologies, as well as mechanical fastening such as with rivets, bolts or screws, may be employed without straying from the teaching of the present invention. FIG. 6, for example, shows one possible alternative embodiment of pad 1 wherein pad 1 is affixed by an exemplary fastener 12 such as a screw or bolt with a head counter-sunken in recess 13. One such fastener 12 is shown for illustration only and is not intended to limit the number of such fasteners.

The vertical scale of FIG. 1 is somewhat distorted to more clearly show the components of foot pad 100. It is to be understood that pad 1 is thickest below stiffener 7 and thinnest above. Typically, pad 1 is 10 mm to 30 mm ($\frac{1}{16}$–$\frac{1}{8}$ inch) thick over stiffener 7 at the surface from which bolts 2 protrude and 380 mm (1½ inch) thick overall. These dimensions can vary depending on the specific make and model of equipment the foot pad 100 is designed to fit and still be encompassed by the teachings of the present invention.

Figure 2:
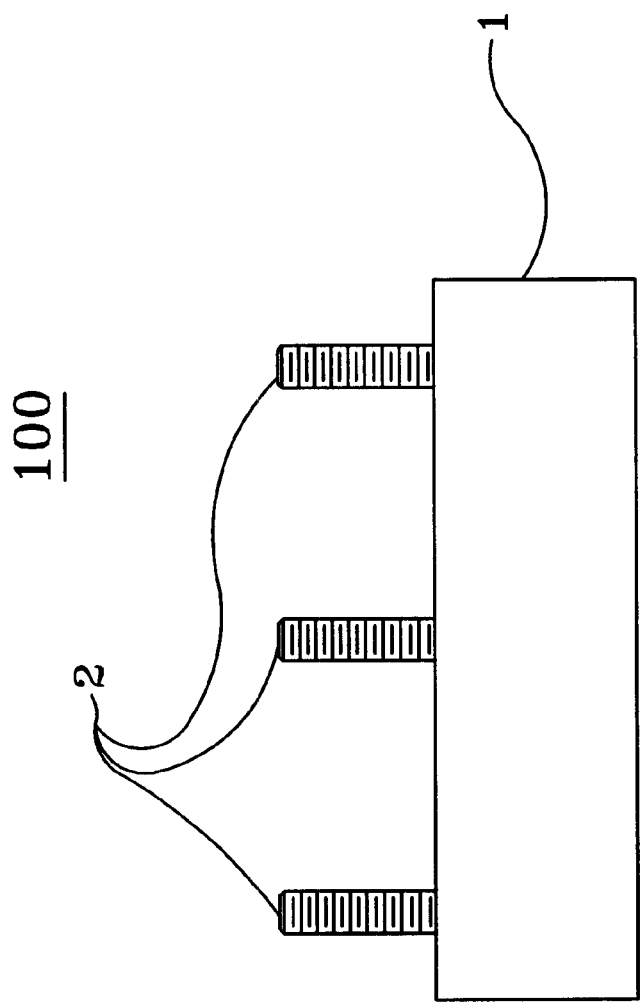
FIG. 2 is a side view of the foot pad of FIG. 1.

FIG. 2 is a side view and best shows that pad 1 completely encapsulates stiffener 7 while leaving bolts 2 exposed for securing the foot pad 100 to the foot of the stabilizer leg. Bolts 2 are typically 110 mm–127 mm (SAE standard $\frac{7}{16}$ to ½ inch) bolts but may be larger or smaller, depending on the equipment make and model the foot pad is intended for. Their length is typically 445 mm (1¾ inches) but may also vary depending on the intended use.

Figure 3:
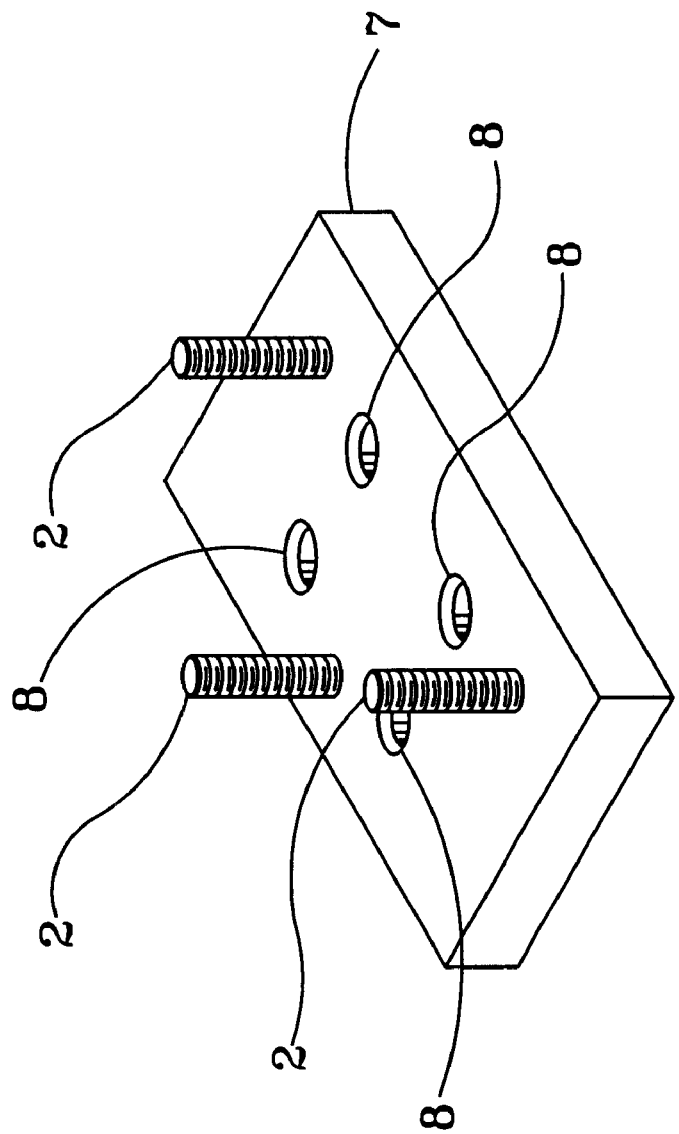
FIG. 3 is a perspective view of the stiffener of the foot pad of FIG. 1.

FIG. 3 is a perspective view of a simple stiffener 7 made according to the present invention. Stiffener 7 has a series of bolts 2 attached and protruding in one direction. The number of bolts 2 can vary from two to ten or more, depending on the specific make and model of equipment the foot pad 100 is intended for. The typical range is 3 to 5 bolts. Stiffener 7 has one or more holes 8 forming holes entirely through stiffener 7. These holes 8 allow the material of pad 1 to completely encapsulate and bond to stiffener 7 during the molding process. The presence of the holes ensures that pad 1 material is continuous between the upper and lower surfaces of foot pad 100, securely positioning stiffener 7.

Figure 4:
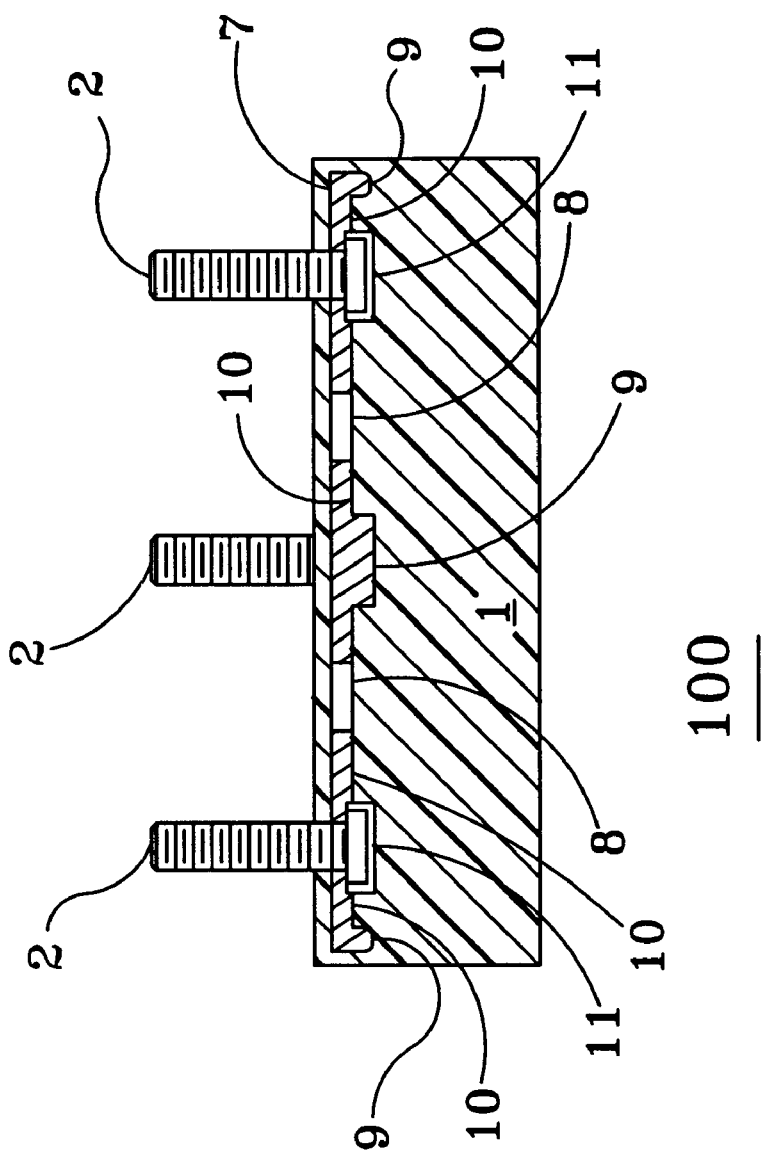
FIG. 4 is a cross section view of the foot pad of FIG. 1.
Figure 5:
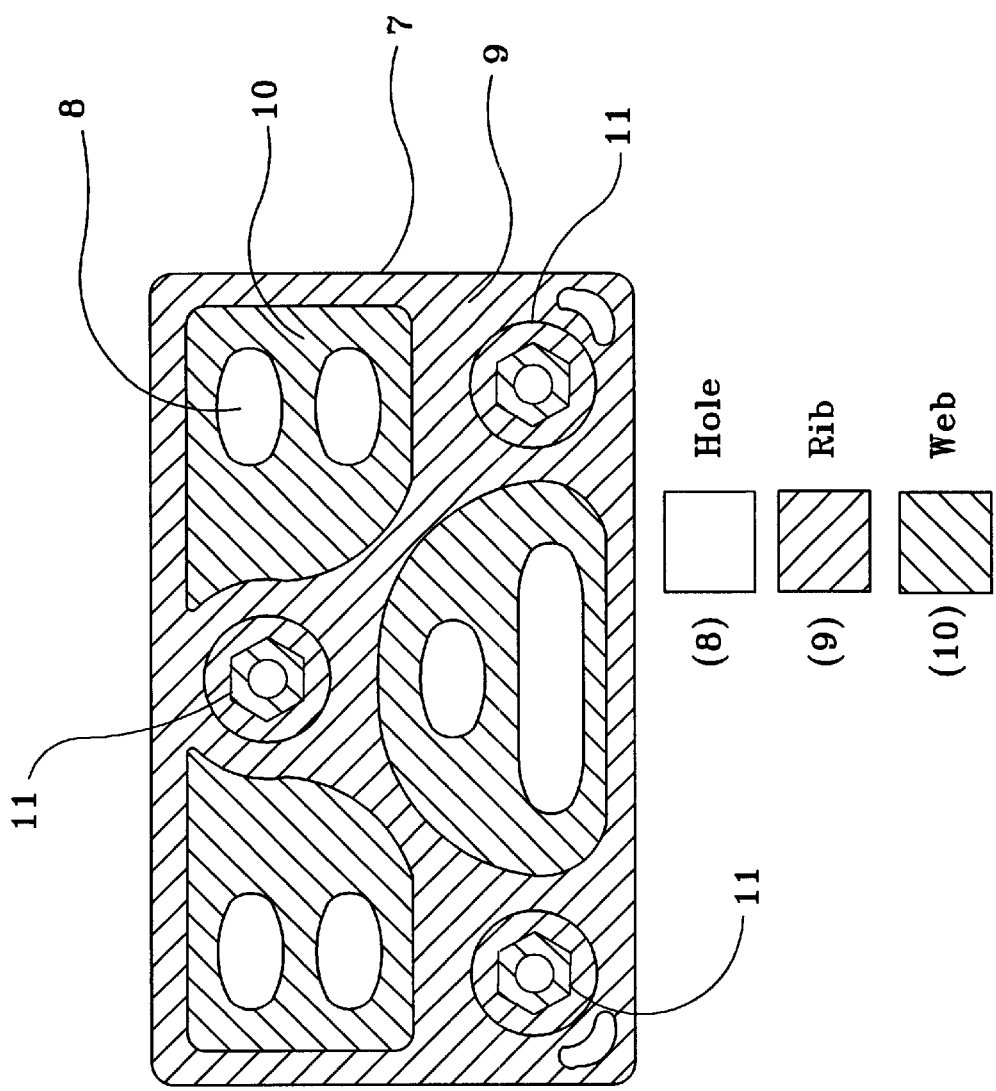
FIG. 5 is a plan view of the stiffener of the foot pad of FIG. 1.

FIGS. 4 and 5 show further details of a more typical stiffener 7. FIG. 4 is a cross section of foot pad 100 taken along the line indicated as AA' in FIG. 1. Stiffener 7 is approximately ¼ inch thick if made of steel and is preferably made with a pattern of holes 8, thickened ribs 9, and thinner webs 10 between ribs 9. The specific pattern is determined according to materials engineering practices depending on the materials of which stiffener 7 is comprised; the make, model and expected use of the equipment upon which foot pad 100 is to be used; and the materials properties of pad 1. The desired pattern may be formed in stiffener 7 by stamping or machining processes as is known in the art. If fibre reinforced polymeric materials are used, a suitable molding process may be employed.

Stiffener 7 is preferably made of metal, typically a steel alloy. Other metals such as aluminum or magnesium, and their alloys, may be used, as may any other high strength metal with suitable strength, manufacturing and/or economic characteristics.

Stiffener 7 preferred design uses an oversized socket receiver 11 in which the hexagonal head of bolt 2 is inserted/positioned without welding, use of retaining nuts or other devices which would otherwise cause the fastener to become rigid in position. Unique to the design, this receiver 11 allows an highly efficient assembly, positive anti-spin retention, while allowing bolt 2 to accept angulation where commonly distorted equipment patterns exist from excessive stress and strain of the equipment in daily use. This flexible "stud to socket" format removes breakage potentials found in welded or pressed-in stud assemblies. Inclusive within the socket design are the ribs 9 and holes 8 which remove/isolate work stresses which are distributed across the entire component, significantly reducing concentrated stresses on the bolt and stiffener plate assembly.

The ribbed design provides increased protection to the concrete/asphalt surfaces in the event a user completely wears through the protective elastomer, by allowing bolt 2 head/protrusions to be embedded at or below the rib's surface lines. Elastomer material, being embedded between the ribs, allows an increased protection for concrete/asphalt surfaces to prevent gouging to the protected surface even when pad 100 has completely worn out its useful working life.

Stiffener 7 plate reduces the metal plate total mass by 40%–70% that of other assembly arts, reducing weight and metal consumption levels.

The present invention has been particularly shown and described with respect to certain preferred embodiments of features thereof. However, it should be readily apparent to those of ordinary skill in the art that various changes and modifications in form and details may be made without departing from the spirit and scope of the invention as set forth in the appended claims.

What is claimed is:

1. A foot pad for a mobile machine utilizing extendible legs having feet for stability in use, comprising:
   a stiffener plate having at least two attaching bolts protruding therefrom in a pattern suitable for mating with a foot of the leg, said plate having oversized sockets for receiving the heads of the bolts; and
   a resilient covering material enveloping the stiffener plate while allowing the bolts to protrude therefrom.

2. The foot pad of claim 1 wherein the stiffener plate has a thickness in the range of 30 millimeters to 200 millimeters (⅛–¾ inch).

3. The foot pad of claim 1 wherein the stiffener plate is made of metal.

4. The foot pad of claim 3 wherein the metal is chosen from the group of alloys of steel, aluminum, magnesium.

5. The foot pad of claim 3 wherein the stiffener is formed with a pattern of ribs, webs and holes therethrough.

6. The foot pad of claim 1 wherein the stiffener plate is made of fiber-reinforced polymeric materials.

7. The foot pad of claim 6 wherein the stiffener is formed with a pattern of ribs, webs and holes therethrough.

8. A foot pad for a mobile machine utilizing extendible legs having feet for stability in use, comprising:
   a steel stiffener plate having at least two attaching bolts protruding therefrom in a pattern suitable for mating with a foot of the leg, said plate formed with a pattern of ribs, webs and holes therethrough and oversized sockets for receiving the heads of said attaching bolts; and
   a resilient material affixed to the stiffener plate while allowing the bolts to protrude therefrom.

9. The foot pad of claim 8 wherein the covering material is molded around and encompasses the stiffener plate.

10. The foot pad of claim 8 wherein the covering material is adhesively adhered to the stiffener plate.

11. The foot pad of claim 8 wherein the covering material is mechanically affixed to the stiffener plate.

12. A foot pad for a mobile machine using extendible legs having feet for stability in use, comprising:
   a stiffener plate having a first side and a second side, further having at least two attaching bolts protruding from the first side, each bolt having a head and a length, the length passing through the plate in a pattern suitable for mating with a foot of the leg, said plate formed on the second side with a pattern of ribs, webs and voids therethrough and an oversized socket for loosely receiving the head of each attaching bolt; and
   a resilient material enveloping the stiffener plate while allowing the length of the bolts to protrude from the resilient material, the resilient material being thicker on the second side of the plate.

13. The foot pad of claim 12 wherein the stiffener plate is composed of a material selected from the group consisting of steel, aluminum, magnesium, titanium fibre-reinforced polymeric material.

14. The foot pad of claim 13 wherein the resilient material is affixed to the stiffener plate by a method selected from the group consisting of encapsulation, adhesion, mechanical fastening.

* * * * *

UNITED STATES PATENT AND TRADEMARK OFFICE
CERTIFICATE OF CORRECTION

PATENT NO. : 6,386,586 B1  
APPLICATION NO. : 09/606415  
DATED : May 14, 2002  
INVENTOR(S) : Don E. Ulery, Jr. and Robert Wells Page 1 of 1

It is certified that error appears in the above-identified patent and that said Letters Patent is hereby corrected as shown below:

On the title page item (75) Inventors: delete Timothy P. Goss

Signed and Sealed this

Eleventh Day of September, 2007

JON W. DUDAS  
*Director of the United States Patent and Trademark Office*